(12) United States Patent
Qi et al.

(10) Patent No.: US 12,039,472 B2
(45) Date of Patent: Jul. 16, 2024

(54) METHOD AND DEVICE FOR SCHEDULING AUTOMATED GUIDED VEHICLE

(71) Applicant: BEIJING JINGDONG QIANSHI TECHNOLOGY CO., LTD., Beijing (CN)

(72) Inventors: Xiaofei Qi, Beijing (CN); Zhikang Liang, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 701 days.

(21) Appl. No.: 17/262,688

(22) PCT Filed: Jul. 31, 2019

(86) PCT No.: PCT/CN2019/098608
§ 371 (c)(1),
(2) Date: Jan. 22, 2021

(87) PCT Pub. No.: WO2020/029845
PCT Pub. Date: Feb. 13, 2020

(65) Prior Publication Data
US 2021/0312359 A1   Oct. 7, 2021

(30) Foreign Application Priority Data
Aug. 6, 2018   (CN) .................... 201810885655.X

(51) Int. Cl.
*G06Q 10/00* (2023.01)
*B60W 60/00* (2020.01)
(Continued)

(52) U.S. Cl.
CPC ... *G06Q 10/06312* (2013.01); *B60W 60/0025* (2020.02); *G05D 1/0225* (2013.01);
(Continued)

(58) Field of Classification Search
CPC .. G06Q 10/06312; G06Q 10/02; G06Q 50/28; B60W 60/0025; G05D 1/0225;
(Continued)

(56) References Cited

U.S. PATENT DOCUMENTS

2009/0083091 A1   3/2009  Rust et al.
2016/0189324 A1*  6/2016  Eramian ................. H04W 4/40
                                                                 705/13

(Continued)

FOREIGN PATENT DOCUMENTS

CN    106373387 A   2/2017
CN    106681324 A   5/2017
(Continued)

OTHER PUBLICATIONS

Chinese Patent Office Action for Application No. 201810885655.X dated Oct. 18, 2022 (5 pages, including an English statement of relevance).

(Continued)

*Primary Examiner* — Mahmoud S Ismail
(74) *Attorney, Agent, or Firm* — Michael Best & Friedrich LLP

(57) ABSTRACT

A method and device for scheduling automated guided vehicles. One method includes acquiring, based on a task for scheduling automated guided vehicles, information of a set of temporary parking points and information of automated guided vehicles; calculating, based on the information of the set of temporary parking points and the information of automated guided vehicles, the number of missing vehicles at each temporary parking point in the set of temporary parking point; selecting, based on the number of missing vehicles, a target temporary parking point from the set of
(Continued)

temporary parking points, and scheduling the automated guided vehicles to be scheduled to the target temporary parking point.

15 Claims, 4 Drawing Sheets

(51) Int. Cl.
  *G05D 1/00* (2006.01)
  *G06Q 10/02* (2012.01)
  *G06Q 10/0631* (2023.01)
  *G07C 11/00* (2006.01)
  *G06Q 10/08* (2023.01)

(52) U.S. Cl.
  CPC .............. *G06Q 10/02* (2013.01); *G07C 11/00* (2013.01); *G06Q 10/08* (2013.01); *G07C 2011/04* (2013.01)

(58) Field of Classification Search
  CPC ............ G05D 2201/0216; G07C 11/00; G07C 2011/04
  USPC .......................................................... 701/23
  See application file for complete search history.

(56) References Cited

U.S. PATENT DOCUMENTS

| | | | |
|---|---|---|---|
| 2017/0076602 A1* | 3/2017 | York | ........................ G08G 1/142 |
| 2018/0096299 A1 | 4/2018 | Jarvis et al. | |
| 2018/0357899 A1* | 12/2018 | Krivacic | ................... G08G 1/14 |
| 2023/0060762 A1* | 3/2023 | Levy | ..................... G05D 1/0214 |
| 2023/0232185 A1* | 7/2023 | Hayes | ................... H04W 4/029 705/13 |

FOREIGN PATENT DOCUMENTS

| | | |
|---|---|---|
| CN | 107025491 A | 8/2017 |
| CN | 107450551 A | 12/2017 |
| DE | 102016116362 A1 | 3/2018 |
| JP | H0918968 A | 1/1997 |
| JP | 2009026166 A | 2/2009 |
| JP | 2011022974 A | 2/2011 |
| JP | 2014041475 A | 3/2014 |
| JP | 2016151940 A | 8/2016 |
| JP | 2018018282 A | 2/2018 |

OTHER PUBLICATIONS

European Patent Office. Extended European Search Report for application 19846865.4, dated Mar. 29, 2022 (10 pages).

Chinese Patent Office Action for Application No. 201810885655.X dated Mar. 22, 2023 (8 pages, including an English statement of relevance).

Japanese Patent Office Action for Application No. 2021503048 dated Sep. 15, 2022 (11 pages, including an English translation).

Translation of International Search Report and Written Opinion for Application No. PCT/CN2019/098608 dated Nov. 8, 2019 (6 pages).

* cited by examiner

METHOD AND DEVICE FOR SCHEDULING AUTOMATED GUIDED VEHICLE

CROSS-REFERENCE TO RELATED APPLICATION(S)

This is a U.S. national stage entry of International Patent Application No. PCT/CN2019/098608, filed on Jul. 31, 2019, which claims priority to Chinese Patent Application No. 201810885655.X, filed on Aug. 6, 2018, the entire contents of each of which are fully incorporated herein by reference.

TECHNICAL FIELD

The present disclosure relates to the field of computer technology, in particular, relates to a method and a device for scheduling automated guided vehicles.

BACKGROUND ART

Warehousing is one of the key parts of logistics. Nowadays, warehousing order picking is performed by manually completing an order picking task in a logical area (i.e., in the warehouse production, a warehouse is generally divided into a plurality of logical areas when the warehouse is relatively large, such that the size of an area for the order picking at a time is controlled within an appropriate range) and then pushing carts by people to push task boxes to a delivery line port for delivery, wherein the boxes need to be unloaded and loaded back and forth between the delivery line port and the order picking area, which consumes a large amount of time and physical strength and affects the operating efficiency.

Therefore, with the large-scale application of intelligent technology, warehousing order picking proposes a new human-machine collaborative order picking mode, in which people are responsible for putting goods into task boxes, and automated guided vehicles (AGVs, which refer to vehicles that can travel along the prescribed guide paths and have safety protection and various transfer functions) are responsible for conveying the task boxes to a delivery line port for delivery. After an AGV vehicle has completed a conveying task, the AGV vehicle needs to be scheduled to a new temporary parking point for a new conveying task. Therefore, as for how to schedule AGV vehicles, it is of research significance. However, as for such new operation mode, there is no effective method for scheduling AGV vehicles.

SUMMARY OF INVENTION

For this reason, the embodiments of the present disclosure provide a method and a device for scheduling automated guided vehicles, and can provide a method for scheduling automated guided vehicles in a human-machine collaborative order picking mode.

In order to realize the above purpose, a method for scheduling automated guided vehicles is provided according to one aspect of the embodiments of the present disclosure.

The method for scheduling automated guided vehicles according to the embodiments of the present disclosure comprises: acquiring, based on a task for scheduling automated guided vehicles, information of a set of temporary parking points and information of automated guided vehicles; calculating, based on the information of the set of temporary parking points and the information of automated guided vehicles, the number of missing vehicles at each temporary parking point in the set of temporary parking points; and selecting, based on the number of missing vehicles, a target temporary parking point from the set of temporary parking points, and scheduling the automated guided vehicles to be scheduled to the target temporary parking point.

Optionally, before calculating, based on the information of the set of temporary parking points and the information of automated guided vehicles, the number of missing vehicles at the set of temporary parking points, the method further comprises: for each temporary parking point in the set of temporary parking points, judging whether the temporary parking point is an idle temporary parking point or an unavailable temporary parking point, and if yes, filtering out the temporary parking point, wherein an idle temporary parking point refers to a temporary parking point at which there are automated guided vehicles that are waiting and there is no automated guided vehicle that is taking a conveying task and will leave within a predetermined time, and an unavailable temporary parking point refers to a temporary parking point at which the preoccupied number of automated guided vehicles reaches the preset maximum threshold.

Optionally, after judging whether the temporary parking point is an idle temporary parking point or an unavailable temporary parking point, the method further comprises: if the temporary parking point is an idle temporary parking point, reserving the automated guided vehicle ranked first in the queue for the temporary parking point, and adding other automated guided vehicles at the temporary parking point to a set of idle vehicles; judging whether there is a busy temporary parking point in the set of temporary parking points, and if yes, scheduling automated guided vehicles in the set of idle vehicles to the busy temporary parking point, wherein the busy temporary parking point refers to a temporary parking point at which the number of automated guided vehicles that perform conveying tasks per unit time exceeds a preset value.

Optionally, calculating, based on the information of the set of temporary parking points and the information of automated guided vehicles, the number of missing vehicles at each temporary parking point in the set of temporary parking points comprises: calculating, for each temporary parking point and based on the information of the set of temporary parking points and the information of the automated guided vehicles, the required number of automated guided vehicles at the temporary parking point, and then determining a difference value between the required number of automated guided vehicles at the temporary parking point and the preoccupied number of automated guided vehicles at the temporary parking point as the number of missing vehicles at the temporary parking point.

Optionally, the information of the set of temporary parking points includes the number of temporary parking spaces at each temporary parking point, and calculating the required number of automated guided vehicles at the temporary parking point includes: determining the number of temporary parking spaces at the temporary parking point as the required number of automated guided vehicles at the temporary parking point.

Optionally, calculating, based on the information of the set of temporary parking points and the information of the automated guided vehicles, the required number of automated guided vehicles at the temporary parking point includes: calculating the corresponding time consumption information at the temporary parking point based on a distance from a starting pickup point at the temporary parking point to the delivery line port, an operating speed of the automated guided vehicles and a conveyance duration at the temporary parking point; calculating, based on the corresponding time consumption information at the temporary parking point and a total number of the automated guided vehicles, the required number of automated guided vehicles at the temporary parking point.

Optionally, calculating, based on the information of the set of temporary parking points and the information of automated guided vehicles, the required number of automated guided vehicles at the temporary parking point includes: calculating, based on the number of task boxes to be conveyed at the temporary parking point and the number of task boxes conveyed by an automated guided vehicle at a time, the required number of automated guided vehicles at the temporary parking point.

Optionally, selecting, based on the number of missing vehicles, a target temporary parking point from the set of temporary parking points includes: comparing the numbers of missing vehicles at the respective temporary parking points in the set of temporary parking points, and selecting a temporary parking point with the maximum number of missing vehicles as the target temporary parking point.

In order to realize the above purpose, a device for scheduling automated guided vehicles is provided according to another aspect of the embodiments of the present disclosure.

The device for scheduling automated guided vehicles according to the embodiments of the present disclosure comprises: an acquiring module for acquiring, based on a task for scheduling automated guided vehicles, information of a set of temporary parking points and information of automated guided vehicles; a calculating module for calculating, based on the information of the set of temporary parking points and the information of automated guided vehicles, the number of missing vehicles at each temporary parking point in the set of temporary parking points; and a scheduling module for selecting, based on the number of missing vehicles, a target temporary parking point from the set of temporary parking points, and scheduling the automated guided vehicles to be scheduled to the target temporary parking point.

Optionally, the device further comprises a filtering module for judging, for each temporary parking point in the set of temporary parking points, whether the temporary parking point is an idle temporary parking point or an unavailable temporary parking point, and if yes, filtering out the temporary parking point, wherein an idle temporary parking point refers to a temporary parking point at which there are automated guided vehicles that are waiting and there is no automated guided vehicle that is taking a transport task and will leave within a predetermined time, and an unavailable temporary parking point refers to a temporary parking point at which the preoccupied number of automated guided vehicles reaches the preset maximum threshold.

Optionally, the filtering module is further used for: if the temporary parking point is an idle temporary parking point, reserving the automated guided vehicle ranked first in the queue for the temporary parking point, and adding other automated guided vehicles at the temporary parking point to a set of idle vehicles; judging whether there is a busy temporary parking point in the set of temporary parking points, and if yes, scheduling automated guided vehicles from the set of idle vehicles to the busy temporary parking point, wherein the busy temporary parking point refers to a temporary parking point at which the number of automated guided vehicles that perform conveying tasks per unit time exceeds a preset value.

Optionally, the calculating module is further used for: calculating, for each temporary parking point and based on the information of the set of temporary parking points and the information of automated guided vehicles, the required number of automated guided vehicles at the temporary parking point, and then determining a difference value between the required number of automated guided vehicles at the temporary parking point and the preoccupied number of automated guided vehicles in the temporary parking point as the number of missing vehicles at the temporary parking point.

Optionally, the information of the set of temporary parking points includes the number of temporary parking spaces at each temporary parking point, and the calculating module is further used for: determining the number of temporary parking spaces at the temporary parking point as the required number of automated guided vehicles at the temporary parking point.

Optionally, the calculating module is further used for: calculating the corresponding time consumption information of the temporary parking point based on a distance from the starting pickup point of the temporary parking point to the delivery line port, an operating speed of the automated guided vehicles and a conveyance duration at the temporary parking point; calculating, based on the corresponding time consumption information of the temporary parking point and the total number of the automated guided vehicles, the required number of automated guided vehicles at the temporary parking point.

Optionally, the calculating module is used for: calculating, based on the number of task boxes to be conveyed at the temporary parking point and the number of task boxes conveyed by an automated guided vehicle at a time, the required number of automated guided vehicles at the temporary parking point.

Optionally, the scheduling module is further used for: comparing the numbers of missing vehicles at the respective temporary parking points in the set of temporary parking points, and selecting a temporary parking point with the maximum number of missing vehicles as the target temporary parking point.

One embodiment in the above invention has the following advantages or beneficial effects: firstly, the number of missing vehicles at each temporary parking point is calculated, then a target temporary parking point is selected based on the number of missing vehicles, and finally, the automated guided vehicles to be scheduled are scheduled to the target temporary parking point, such that a method for scheduling automated guided vehicles in a human-machine collaborative order picking mode can be provided; in the embodiment of the present disclosure, idle temporary parking points and unavailable temporary parking points are filtered out before the number of missing vehicles is calculated, such that the accuracy of scheduling AGV vehicles is improved; in the embodiment of the present disclosure, after a temporary parking point is determined as an idle temporary parking point, the redundant AGV vehicles at the idle temporary parking point are placed in a set of idle vehicles, such that AGV vehicles can be scheduled from the set of idle vehicles to a busy temporary parking point; in the embodiment of the present disclosure, during calculation of the number of missing vehicles at each temporary parking point, the required number of AGV vehicles at each temporary parking point is firstly calculated according to the actual conditions, and then a difference value between the required number and the preoccupied number is determined as the number of missing vehicles, such that practicability and feasibility of the present technical solution can be improved; in the embodiment of the present disclosure, the required number of AGV vehicles at each temporary parking point is calculated in consideration of multiple perspectives such as the number of temporary parking spaces, the time consumption information and the task boxes to be conveyed, such that a variety of scenario requirements can be provided, which increases the scheduling efficiency of the AGV vehicles and further improves the practicability of the present solution; in the embodiment of the present disclosure, a target temporary parking point is selected by comparing the numbers of missing vehicles, such that AGV vehicles to be scheduled can be allocated to the target temporary parking point.

The further effects achieved by the above non-conventional optional manners will be explained below in conjunction with specific embodiments.

DESCRIPTION OF THE DRAWINGS

Drawings are used for better understandings of the present disclosure, but do not construe improper definitions of the present disclosure, wherein.

DESCRIPTION OF THE EMBODIMENTS

Explanations about the exemplary embodiments of the present disclosure will be made below with reference to the drawings, including various details of the embodiments of the present disclosure so as to help to understand, and the exemplary embodiments should be regarded as merely exemplary. Therefore, a person of ordinary skill in the art should recognize that various changes and modifications can be made to the embodiments described herein without departing from the scope and spirit of the present disclosure. Also, for the sake of clarity and conciseness, descriptions of well-known functions and structures are omitted in the following descriptions.

Figure 1:
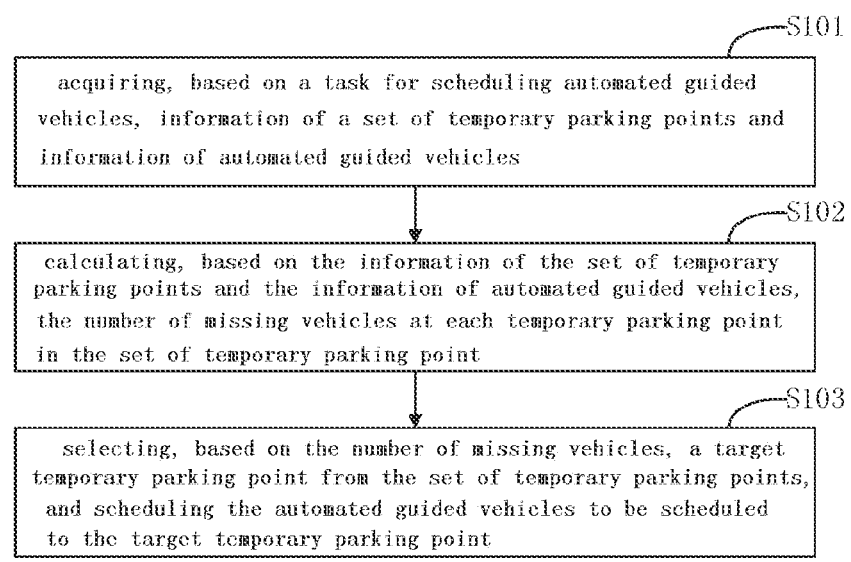
FIG. 1 is a schematic diagram illustrating the main procedures of the method for scheduling automated guided vehicles according to the embodiments of the present disclosure.

FIG. 1 is a schematic diagram illustrating the main procedures of the method for scheduling automated guided vehicles according to the embodiments of the present disclosure. According to a reference embodiment of the present disclosure, as shown in FIG. 1, the method for scheduling automated guided vehicles mainly comprises the following steps:

step S101: acquiring, based on a task for scheduling automated guided vehicles, information of a set of temporary parking points and information of automated guided vehicles;

step S102: calculating, based on the information of the set of temporary parking points and the information of automated guided vehicles, the number of missing vehicles at each temporary parking point in the set of temporary parking point;

step S103: selecting, based on the number of missing vehicles, a target temporary parking point from the set of temporary parking points, and scheduling the automated guided vehicles to be scheduled to the target temporary parking point.

Nowadays, a new human-machine collaborative order picking mode is proposed, in which carts are pushed by people to perform order picking in the pedestrian picking passages within logical areas each being equipped with several temporary parking points. Upon completion of order picking by people, task boxes loaded with products are conveyed to a nearby temporary parking point by carts which are pushed by people, and then the task boxes are conveyed by the AGV vehicles to a delivery line port for delivery. The AGV vehicles travel in the peripheral main passages, which can realize fast conveyance and thereby can improve the picking efficiency. In the present disclosure, the set of temporary parking points includes at least one temporary parking point. A temporary parking point is a position where the AGV vehicles (i.e., automated guided vehicles, which are referred to as AGV vehicles hereinafter for the convenience of description) are waiting to convey the task boxes. In the present disclosure, at step S010, after a scheduling task is received, information of the set of temporary parking points and information of the AGV vehicles are acquired firstly; then step S102 is executed to calculate the number of missing vehicles at each temporary parking point based on the acquired information, where the number of missing vehicles is the number of AGV vehicles that can be still accommodated at the temporary parking point; finally, step S103 is executed to select a target temporary parking point from the set of temporary parking points based on the calculated number of missing vehicles, such that the AGV vehicles to be scheduled can be allocated to the selected target temporary parking point.

In another reference embodiment of the present disclosure, before step S102 of calculating, based on the information of the set of temporary parking points and the information of automated guided vehicles, the number of missing vehicles at the set of temporary parking points, the method for scheduling automated guided vehicles in the present disclosure further comprises: judging, for each temporary parking point in the set of temporary parking points, whether the temporary parking point is an idle temporary parking point or an unavailable temporary parking point, and if yes, filtering out the temporary parking point. In this step, idle temporary parking points and unavailable temporary parking points are filtered out.

Herein, an idle temporary parking point refers to a temporary parking point at which there are automated guided vehicles that are waiting and there is no automated guided vehicle that is taking a conveying task and will leave within a predetermined time. When there are AGV vehicles waiting at a certain temporary parking point, but there is no AGV vehicle that is taking a conveying task and will leave within 3 minutes (the predetermined time may be but not limited to 3 minutes, and configurations can be made according to the actual conditions), then the temporary parking point is marked as an idle temporary parking point. In a further embodiment of the present disclosure, if a temporary parking point is an idle temporary parking point, the AGV vehicle ranked first in the queue for the temporary parking point is reserved, and other AGV vehicles at the temporary parking point are added to a set of idle vehicles. For example, if a temporary parking point A is determined as an idle temporary parking point, and there are 5 AGV vehicles at the temporary parking point, then the AGV vehicle ranked first is reserved, and the AGV vehicles ranked second to fifth are added to the set of idle vehicles. It should be noted that: the set of idle vehicles is refreshed every period of time (which may be but not limited to 30 second and which is not defined in the present disclosure).

In the embodiments of the present disclosure, it is necessary to judge whether there is a busy temporary parking point in the set of temporary parking points, and if yes, AGV vehicles are scheduled from the set of idle vehicles to the busy temporary parking point, wherein the busy temporary parking point refers to a temporary parking point at which the number of AGV vehicles that perform conveying tasks per unit time exceeds a preset value. For example, if the number of AGV vehicles that have performed a conveying task at a temporary parking point B and will leave per unit time (which may be but not limited to 5 minutes and which is not defined in the present disclosure) is 5, but the preset value is 4 (which may be but not limited to 4 and which is not defined in the present disclosure), then the temporary parking point B is regarded as a busy temporary parking point. As for the busy temporary parking point, a request can be also made to schedule vehicles from the set of idle vehicles.

An unavailable temporary parking point refers to a temporary parking point at which the preoccupied number of AGV vehicles reaches the preset maximum threshold, wherein the preoccupied number of AGV vehicles includes: the number of AGV vehicles which have parked at the temporary parking point, and the number of AGV vehicles which are travelling towards the temporary parking point. The setting of the preset maximum threshold is determined by the temporary parking places at the temporary parking point and the buffer coefficients. A temporary parking point may include a plurality of temporary parking places, but only one AGB vehicle can be parked in each temporary parking place. A buffer coefficient is used is used to buffer a situation in which an AGV vehicle occupies a temporary parking space but is still travelling on the road. If the preoccupied number of AGV vehicles is larger than the preset maximum threshold, then the temporary parking point is unavailable and no AGV vehicle can be parked at the temporary parking point. Thus, the temporary parking point is considered as an unavailable temporary parking point In the present disclosure, it is possible to firstly filter out idle temporary parking points and unavailable temporary parking points, or judge, after calculating the number of missing vehicles at each temporary parking point and selecting a target temporary parking point, whether the target temporary parking point is an idle temporary parking point or an unavailable temporary parking point, and if yes, reselect a new target temporary parking point and then judge whether the new target temporary parking point is an idle temporary parking point or an unavailable temporary parking point, and so forth, until a temporary parking point which meets the requirements is found. Of course, temporary parking points are filtered firstly in the preferred embodiments of the present disclosure.

In a reference embodiment of the present application, information of the AGV vehicles may include: the preoccupied number of AGV vehicles at each temporary parking point. The above step S102 of calculating, based on the information of the set of temporary parking points and the information of AGV vehicles, the number of missing vehicles at each temporary parking point in the set of temporary parking points may include: calculating, for each temporary parking point and based on the information of the set of temporary parking points and the information of AGV vehicles, the required number of AGV vehicles at the temporary parking point, and then determining a difference value between the required number of AGV vehicles at the temporary parking point and the preoccupied number of AGV vehicles at the temporary parking point as the number of missing vehicles at the temporary parking point. In the present disclosure, it is necessary to calculate the number of AGV vehicles required for each temporary parking point in the set of temporary parking points, and then calculate a difference value between the required number and the preoccupied number as the number of missing vehicles at the temporary parking point. For example, if the preoccupied number of AGV vehicles at the temporary parking point A is 5, and the required number of AGV vehicles at the temporary parking point A is 8, then the number of missing vehicles at the temporary parking point A is 3.

In the embodiments of the present disclosure, the information of the set of the temporary parking points may include: the number of temporary parking spaces at each temporary parking point. Thus, it is possible to calculate the required number of AGV vehicles at a temporary parking point based on the number of temporary parking spaces at the temporary parking point, specifically including: determining the number of temporary parking spaces at the temporary parking point as the required number of AGV vehicles at the temporary parking point. In the present disclosure, it is possible to directly use the number of parking spaces at the temporary parking point as the required number of AGV vehicles.

In a further reference embodiment of the present disclosure, information of the set of temporary parking points may include: a distance from a starting pickup point of each temporary parking point to a delivery line port, and a conveyance duration at each temporary parking point; information of AGV vehicles may include: an operating speed of the AGV vehicles, and a total number of the AGV vehicles. In this way, calculating the required number of AGV vehicles at a temporary parking point may include: calculating the corresponding time consumption information at the temporary parking point based on a distance from a starting pickup point of the temporary parking point to a delivery line port, an operating speed of the automated guided vehicles and a conveyance duration at the temporary parking point; calculating, based on the corresponding time consumption information at temporary parking point and the total number of the AGV vehicles, the required number of automated guided vehicles at the temporary parking point. The benefits of such process are that: AGV vehicles are not allocated simply based on the number of temporary parking spaces at each temporary parking point, and the conveying capabilities of the AGV vehicles is taken into consideration, such that the balance of processing capability of each temporary parking point can be ensured. The required number of AGV vehicles at a temporary parking point i is calculated by:

$$n_i = \frac{c_i}{\sum_j c_j} n_{Cat}$$

wherein $c_i = d_i/v + LP$ which indicates the time consumption information of a round trip for an AGV vehicle, $d_i$ is a distance from a starting pickup point at the temporary parking point i to a delivery line port and indicates a distance of a round trip in the present disclosure, i.e., a distance from the starting pickup point to the delivery line port plus a distance from the delivery line port to the starting pickup point; v indicates an operating speed of the AGV vehicle; LP is a conveyance duration at the temporary parking point, i.e., a duration during which task boxes are moved to the AGV vehicle; $n_{car}$ indicates the total number of the AGV vehicles; j indicates the number of temporary parking points.

In a further reference embodiment of the present disclosure, information of the set of temporary parking points may include the number of task boxes to be conveyed at each temporary parking point, and information of AGV vehicles may include the number of task boxes conveyed by an AGV vehicle at a time. In the present disclosure, each temporary parking point is equipped with a task box buffer point for buffering task boxes. When there is no AGV vehicle or the number of AGV vehicles is not sufficient at a temporary parking point, a picker places task boxes for which order picking is completed in the task box buffer point so as to go on with a new order picking task. After knowing the number of task boxes to be conveyed, calculating the required number of AGV vehicles at the temporary parking point may include: calculating, based on the number of task boxes to be conveyed at the temporary parking point and the number of task boxes conveyed by an AGV vehicle at a time, the required number of AGV vehicles at the temporary parking point. The required number of AGV vehicles at the temporary parking point i is calculated by:

$$n_i = \lfloor (m_i + b - 1)/b \rfloor$$

wherein $m_i$ indicates the number of task boxes to be conveyed at the temporary parking point i, b is the number of task boxes conveyed by an AGV vehicle at a time, and the symbol $\lfloor \, \rfloor$ indicates rounding down, for example, rounding the number 2.5 down to 2. For example, the number of task boxes to be conveyed is 17, and the maximum number of task boxes that can be conveyed by an AGV vehicle at a time is 3, then the required number of AGV vehicles is 6 by the above formula.

In the embodiments of the present disclosure, selecting, based on the number of missing vehicles, a target temporary parking point from the set of temporary parking points in above step S013 may include: comparing the numbers of missing vehicles at the respective temporary parking points in the set of temporary parking points, and selecting a temporary parking point with the maximum number of missing vehicles as a target temporary parking point. Explanations are specifically made as follows: the numbers of missing vehicles at each temporary parking point are compared, and a temporary parking point with the maximum number of missing vehicles is selected as the target temporary parking point. Of course, if the numbers of missing vehicles at a plurality of temporary parking points are the same and are the maximum, a temporary parking point is randomly selected from the plurality of temporary parking points as a target temporary parking point.

Figure 2:
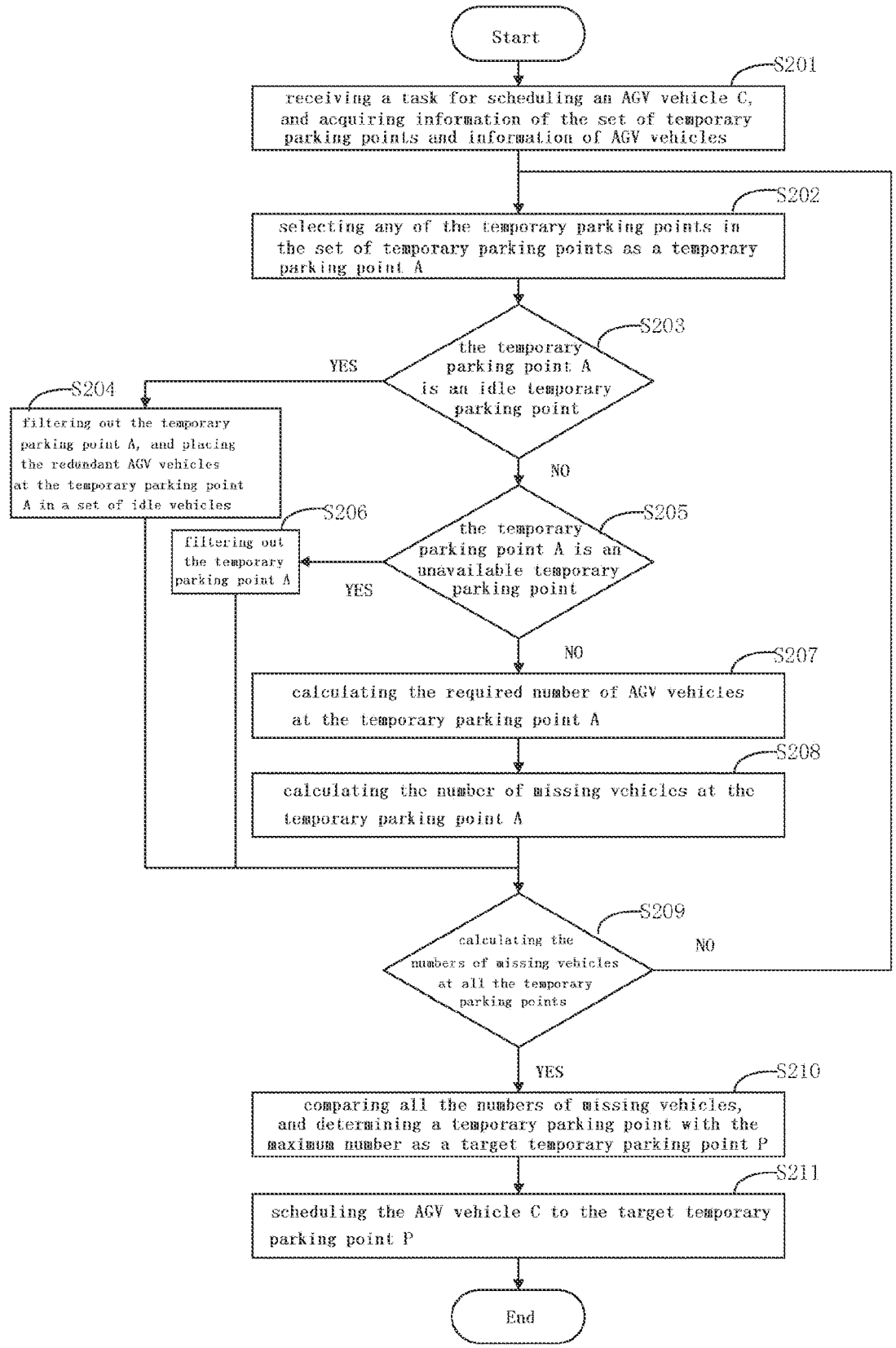
FIG. 2 is a schematic diagram illustrating the main procedures of the method for scheduling automated guided vehicles according to a reference embodiment of the present disclosure.

FIG. 2 is a schematic diagram illustrating the main procedures of the method for scheduling automated guided vehicles according to a reference embodiment of the present disclosure. As shown in FIG. 2, the main procedures of the method for scheduling automated guided vehicles according to the present disclosure can include:

step S201: receiving a task for scheduling an AGV vehicle C, and acquiring information of the set of temporary parking points and information of AGV vehicles:

step S202: selecting any of the temporary parking points in the set of temporary parking points as a temporary parking point A;

step S203: judging whether the temporary parking point A is an idle temporary parking point, and if yes, executing step S204, otherwise executing step S205;

step S204: filtering out the temporary parking point A, reserving the AGV vehicle ranked first in the queue for the temporary parking point A, and adding other AGV vehicles at the temporary parking point A to a set of idle vehicles.

step S205: judging whether the temporary parking point A is an unavailable temporary parking point, and if yes, executing step S206, otherwise executing step S207;

step S206: filtering out the temporary parking point A;

step S207: calculating, based on the information of the temporary parking point A in the set of temporary parking points and information of the AGV vehicles, the required number of AGV vehicles at the temporary parking point A;

step S208: determining a difference value between the required number of AGV vehicles at the temporary parking point A and the preoccupied number of AGV vehicles at the temporary parking point A as the number of missing vehicles at the temporary parking point A;

step S209: judging whether to calculate the numbers of missing vehicles at all the temporary parking points in the set of temporary parking points, and if yes, executing step S210;

step S210: comparing all the numbers of missing vehicles to obtain a maximum number of missing vehicles, and determining a temporary parking point with the maximum number as a target temporary parking point P;

step S211: scheduling the AGV vehicle C to the target temporary parking point P.

It should be noted that: apart from judging whether a temporary parking point is an idle temporary parking point or an unavailable temporary parking point, the method in the present disclosure further comprises: judging whether there is a busy temporary parking point in the set of temporary parking points, and if yes, requesting to allocate AGV vehicles in the set of idle vehicles to the busy temporary parking point. In addition, the judging sequence in above steps S203 and S205 can be adjusted according to actual conditions. For example, it is possible to firstly judge whether the temporary parking point A is an unavailable temporary parking point and then judge whether the temporary parking point A is an idle temporary parking point, or it is also possible to judge whether the temporary parking point A is an unavailable temporary parking point or an idle temporary parking point at the same time. Of course, there are also other executing sequences, and no definitions are made in the present disclosure.

It should be noted that: calculating, based on the information of the temporary parking point A in the set of temporary parking points and information of AGV vehicles, the required number of AGV vehicles at the temporary parking point A in the above step S207 may include: (1) if the acquired information of the temporary parking point A is the number of temporary parking spaces at the temporary parking point A, the number of temporary parking spaces can be directly defined as the required number of AGV vehicles at the temporary parking point A; (2) if the acquired information of the temporary parking point A includes a distance from the starting pickup point at the temporary parking point A to a delivery line port and a conveyance duration at the temporary parking point A, and meanwhile the information of AGV vehicles includes an operating speed and a total number, the time consumption cost information at the temporary parking point A can be calculated, and then the required number at the temporary parking point A is calculated based on the time consumption cost; (3) under the precondition where the number of task boxes to be conveyed at the temporary parking point A is known, the required number at the temporary parking point A can be calculated based on the number of task boxes. If all of the above three calculation methods can be implemented, it is possible to configure a priority sequence for the three methods according to the actual conditions, for example, preferably use the number of task boxes to calculate the required number of AGV vehicles at the temporary parking point if the number of task boxes to be conveyed can be determined. It is also possible to configure weight values for the three methods, and then calculate the required number of AGV vehicles at the temporary parking point A according to a weighted algorithm. Of course, there are other manners for determining the number of missing vehicles, and no definitions are made in the present disclosure.

It can be seen from the technical solution of scheduling AGV vehicles according to the embodiments of the present disclosure that: firstly, the number of missing vehicles at each temporary parking point is calculated, then a target temporary parking point is selected based on the number of missing vehicles, and finally, the AGV vehicles to be scheduled are scheduled to the target temporary parking point, such that a method for scheduling automated guided vehicles in a human-machine collaborative order picking mode can be provided; in the embodiments of the present disclosure, before the number of missing vehicles is calculated, idle temporary parking points and unavailable temporary parking points are filtered out such that the accuracy of scheduling AGV vehicles can be improved; in the embodiments of the present disclosure, after a temporary parking point is determined as an idle temporary parking point, the redundant AGV vehicles at the idle temporary parking point are placed in a set of idle vehicles, such that AGV vehicles in the set of idle vehicles can be scheduled to a busy temporary parking point, in the embodiments of the present disclosure, during calculation of the number of missing vehicles at each temporary parking point, firstly, the required number of AGV vehicles at each temporary parking point is calculated according to the actual conditions, and then a difference value between the required number and the preoccupied number is determined as the number of missing vehicles, such that practicability and feasibility of the present technical solution can be improved; in the embodiments of the present disclosure, the required number of AGV vehicles at each temporary parking point is calculated in consideration of multiple perspectives such as the number of temporary parking spaces, the time consumption information and the task boxes to be conveyed, such that a variety of scenario requirements can be provided, which increases the scheduling efficiency of the AGV vehicles and further improves the practicability of the present solution; in the embodiments of the present disclosure, a target temporary parking point is selected by comparing the numbers of missing vehicles, such that AGV vehicles to be scheduled can be allocated to the target temporary parking point.

Figure 3:
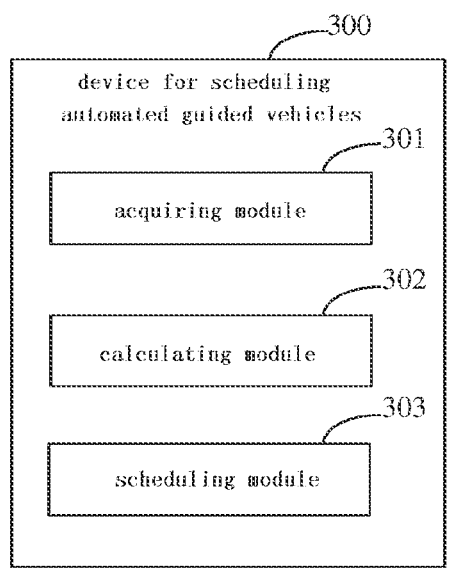
FIG. 3 is a schematic diagram illustrating the main modules of the device for scheduling automated guided vehicles according to the embodiments of the present disclosure.

FIG. 3 is a schematic diagram illustrating the main modules of the device for scheduling automated guided vehicles according to the embodiments of the present disclosure. As shown in FIG. 3, the device 300 for scheduling automated guided vehicles according to the present disclosure comprises the following modules: an acquiring module 301, a calculating module 302 and a scheduling module 303.

Herein, the acquiring module 301 is used for acquiring, based on a task for scheduling automated guided vehicles, information of a set of temporary parking points and information of automated guided vehicles. The calculating module 302 is used for calculating, based on the information of the set of temporary parking points and the information of automated guided vehicles, the number of missing vehicles at each temporary parking point in the set of temporary parking points. The scheduling module 303 is used for selecting, based on the number of missing vehicles, a target temporary parking point from the set of temporary parking points, and scheduling automated guided vehicles to be scheduled to the target temporary parking point.

In the embodiments of the present disclosure, the device 300 for scheduling automated guided vehicles may further comprise a filtering module (not shown in the figures). The filtering module is used for: judging, for each temporary parking point in the set of temporary parking points, whether the temporary parking point is an idle temporary parking point or an unavailable temporary parking point, and if yes, filtering out the temporary parking point, wherein an idle temporary parking point refers to a temporary parking point at which there are automated guided vehicles that are waiting and there is no automated guided vehicle that is taking a conveying task and will leave within a predetermined time, and an unavailable temporary parking point refers to a temporary parking point at which the preoccupied number of automated guided vehicles reaches the preset maximum threshold.

In the embodiments of the present disclosure, the filtering module is further used for: if the temporary parking point is an idle temporary parking point, reserving the automated guided vehicle ranked first in the queue for the temporary parking point, and adding other automated guided vehicles at the temporary parking point to a set of idle vehicles; judging whether there is a busy temporary parking point in the set of temporary parking points, and if yes, scheduling automated guided vehicles in the set of idle vehicles to the busy temporary parking point, wherein the busy temporary parking point refers to a temporary parking point at which the number of automated guided vehicles that are perform conveying tasks per unit time exceeds a preset value.

In the embodiments of the present disclosure, the information of automated guided vehicles may include: the preoccupied number of automated guided vehicles at each temporary parking point, and the calculating module 302 is further used for: calculating, for each temporary parking point and based on the information of the set of temporary parking points and the information of automated guided vehicles, the required number of automated guided vehicles at the temporary parking point, and then determining a difference value between the required number of automated guided vehicles at the temporary parking point and the preoccupied number of automated guided vehicles at the temporary parking point as the number of missing vehicles at the temporary parking point.

In the embodiments of the present disclosure, the information of the set of temporary parking points may include the number of temporary parking spaces at each temporary parking point, and the calculating module 302 is further used for: determining the number of temporary parking spaces at the temporary parking point as the required number of automated guided vehicles at the temporary parking point.

In the embodiments of the present disclosure, the information of the set of temporary parking points may include: a distance from a starting pickup point at each temporary parking point to a delivery line port, and a conveyance duration at each temporary parking point; the information of automated guided vehicles may include: an operating speed of the automated guided vehicles and a total number of the automated guided vehicles; and the calculating module 302 is further used for: calculating the corresponding time consumption information at the temporary parking point based on the distance from the starting pickup point of the temporary parking point to the delivery line port, the operating speed of the automated guided vehicles and the conveyance duration at the temporary parking point; calculating, based on the corresponding time consumption information at the temporary parking point and the total number of the automated guided vehicles, the required number of automated guided vehicles at the temporary parking point.

In the embodiments of the present disclosure, the information of the set of temporary parking points may include the number of task boxes to be conveyed at each temporary parking point; the information of automated guided vehicles may include the number of task boxes conveyed by an automated guided vehicle at a time; and the calculating module 302 is used for: calculating, based on the number of task boxes to be conveyed at the temporary parking point and the number of task boxes conveyed by an automated guide vehicle at a time, the required number of automated guided vehicles at the temporary parking point.

In the embodiments of the present disclosure, the scheduling module 303 may be further used for: comparing the numbers of missing vehicles, and selecting a temporary parking point with the maximum number of missing vehicles as a target temporary parking point.

It can be seen from the above descriptions that: firstly, the number of missing vehicles at each temporary parking point is calculated, then a target temporary parking point is selected based on the number of missing vehicles, and finally, the automated guided vehicles to be scheduled are scheduled to the target temporary parking point, such that a method for scheduling automated guided vehicles in a human-machine collaborative order picking mode can be provided; in the embodiments of the present disclosure, idle temporary parking points and unavailable temporary parking points are filtered out before the number of missing vehicles is calculated, such that the accuracy of scheduling AGV vehicles can be improved; in the embodiments of the present disclosure, after a temporary parking point is determined as an idle temporary parking point, the redundant AGV vehicles at the idle temporary parking point are placed in a set of idle vehicles, such that AGV vehicles can be scheduled from the set of idle vehicles to the busy temporary parking point; in the embodiments of the present disclosure, during calculation of the number of missing vehicles at each temporary parking point, firstly, the required number of AGV vehicles at each temporary parking point is calculated according to the actual conditions, and then a difference value between the required number and the preoccupied number is determined as the number of missing vehicles, such that practicability and feasibility of the present technical solution can be improved; in the embodiments of the present disclosure, the required number of the AGV vehicles at each temporary parking point is calculated in consideration of multiple perspectives such as the number of temporary parking spaces, the time consumption information and the task boxes to be conveyed, such that a variety of scenario requirements can be provided, which increases the scheduling efficiency of the AGV vehicles and further improves the practicability of the present solution; in the embodiments of the present disclosure, a target temporary parking point is selected by comparing the numbers of missing vehicles, such that AGV vehicles to be scheduled can be allocated to the target temporary parking point.

Figure 4:
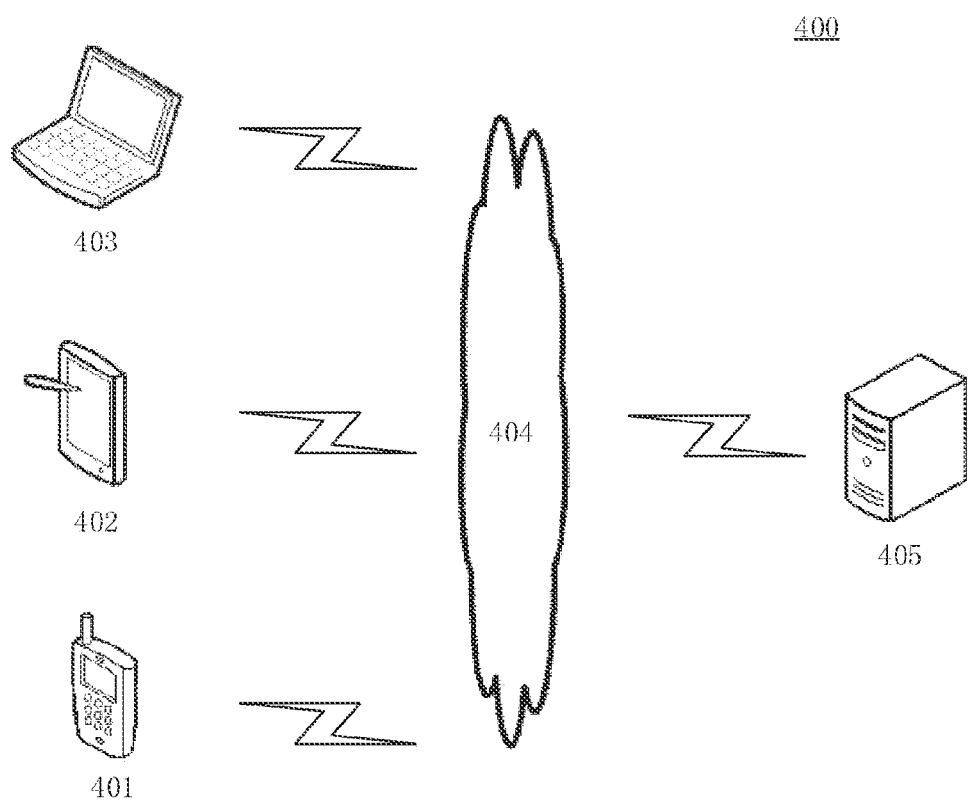
FIG. 4 is an exemplary system architecture diagram in which the embodiments of the present disclosure can be applied.

FIG. 4 shows an exemplary system architecture 400 in which the method for scheduling automated guided vehicles or the device for scheduling automated guided vehicles according to the embodiments of the present disclosure can be applied.

As shown in FIG. 4, the system architecture 400 may comprise terminal devices 401, 402, 403, a network 404 and a server 405. The network 404 is used for providing communication links between the terminal devices 401, 402, 403 and the server 405. The network 404 may include various types of connection types, such as wired links, wireless communication links, fiber-optic cables and the like.

A user can use the terminal devices 401, 402, 403 to interact with the server 405 through the network 404, so as to receive or send a message or the like. On the terminal devices 401, 402, 403, various communication client applications can be installed, such as shopping applications, web browser applications, search applications, instant messaging tools, email clients, social platform software and so on (which are only exemplary).

The terminal devices 401, 402, 403 may be various electronic devices with a display screen and supporting web browsing, including but not limited to smart phones, tablet computers, laptop-type portable computers, desktop computers, and so on.

The server 405 may be a server which provides various services, such as a backend management server (which is only exemplary) which provides support for shopping websites browsed by users via the terminal devices 401, 402, 403. The backend management server can process, such as analyze, the received product information query request and other data, and feedback the processing results (such as target push information, product information—only exemplary) to the terminal devices.

It should be noted that: the method for scheduling automated guided vehicles provided in the embodiments of the present disclosure is generally performed by the server 405. Accordingly, the device for scheduling automated guided vehicles is generally disposed in the server 405.

It should be understood that the number of the terminal devices, the network and the server is only illustrative in FIG. 4. The system architecture 400 may comprise any number of terminal devices, networks and servers according to the implementation requirements.

Figure 5:
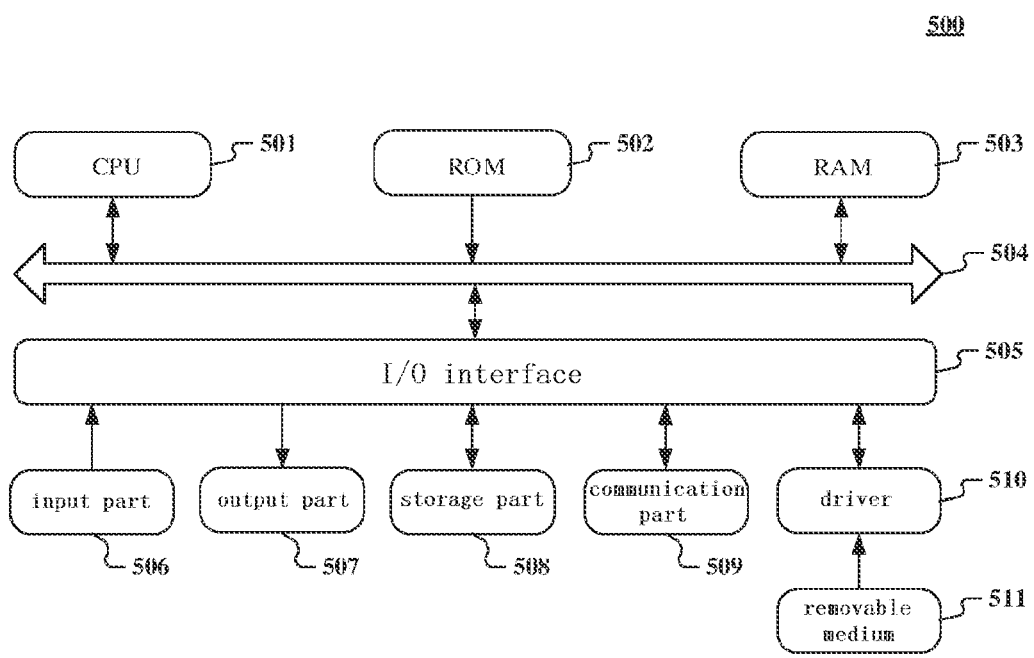
FIG. 5 is a schematic diagram illustrating the structure of a computer system of the terminal devices or server suitable for implementing the embodiments of the present disclosure.

Referring now to FIG. 5, which is a schematic diagram illustrating the structure of a computer system 500 of the terminal devices suitable for implementing the embodiments. The terminal devices shown in FIG. 5 are only exemplary, and should not construe any definitions of the function and scope of use of the embodiments of the present disclosure.

As shown in FIG. 5, the computer system 500 comprises a central processing unit (CPU) 501, which can perform various appropriate actions and processing according to a program stored in a read only memory (ROM) 502 or a program loaded from a storage part 508 to a random access memory (RAM) 503. In the RAM 503, various programs and data required for operations of the system 500 are also stored. The CPU 501, ROM 502, and RAM 503 are connected to one another through a bus 504. An input/output (I/O) interface 505 is also connected to the bus 504.

The following components are connected to the I/O interface 505: an input part 506 including a keyboard, a mouse, etc.; an output part 507 including a cathode ray tube (CRT), a liquid crystal display (LCD), a speaker, etc.; a storage part 508 including a hard disk, etc.; and a communication part 509 including a network interface card such as a LAN card, a modem, etc. The communication part 509 performs communication processing via a network such as the Internet. A driver 510 is also connected to the I/O interface 505 as needed. A removable medium 511, such as a magnetic disk, an optical disk, a magneto-optical disk, a semiconductor memory or the like, is installed on the driver 510 as needed, such that computer programs read from the driver 510 can be installed in the storage part 508 as needed.

In particular, according to the embodiments of the present disclosure, the above process described with reference to the flowchart can be implemented as a computer software program. For example, the embodiments of the present disclosure comprise a computer program product, which includes a computer program carried on a computer-readable medium, the computer program including a program code for executing the method as shown in the flowchart. In such embodiments, the computer program may be downloaded and installed from the network through the communication part 509, and/or installed from the removable medium 511. When the computer program is executed by the central processing unit (CPU) 501, the above functions defined in the system of the present disclosure are performed.

It should be noted that: the computer-readable medium in the present disclosure may be a computer-readable signal medium or a computer-readable storage medium or any combination thereof. The computer-readable storage medium may be, for example, but not limited to, an electrical, magnetic, optical, electromagnetic, infrared, or semiconductor system, apparatus, or device, or any combination thereof. More specific examples of the computer-readable storage medium may include, but not limited to, an electrical connection with one or more wires, a portable computer disk, a hard disks, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium that contains or stores a program, which may be used by or in combination with an instruction execution system, apparatus, or device. In the present disclosure, a computer-readable signal medium may include a data signal propagated in a baseband or as a part of a carrier, in which a computer-readable program code is carried. The data signal which is propagated in this way may be in various forms, including but not limited to an electromagnetic signal, an optical signal, or any suitable combination thereof. The computer-readable signal medium may also be any computer-readable medium other than the computer-readable storage medium. The computer-readable medium may send, propagate, or transmit a program for use by or in combination with an instruction execution system, apparatus or device. The program code contained on the computer-readable medium can be transmitted by any suitable medium, including but not limited to: wireless medium, wire, optical cable, RF, etc., or any suitable combination thereof.

The flowcharts and block diagrams in the drawings illustrate the system architecture, functions, and operations, which may be implemented, of the system, method, and computer program product according to various embodiments of the present disclosure. In this regard, each block in the flowcharts or block diagrams may represent a module, a program segment, or a part of the code, which includes one or more executable instructions for realizing the specified logic functions. It should also be noted that: in some alternative implementations, the functions marked in the blocks may also occur in a different order from the order marked in the drawings. For example, two blocks shown successively can be actually executed in parallel substantially, and they can sometimes be executed in a reverse order, depending on the functions involved. It should also be noted that: each block in the block diagrams or flowcharts and a combination of blocks in the block diagrams or flowcharts can be implemented by a dedicated hardware-based system that performs specified functions or operations, or can be implemented by a combination of dedicated hardware and computer instructions.

The involved modules described in the embodiments of the present disclosure can be implemented in software or hardware. The described modules may also be provided in a processor which is, for example, described as a processor comprising an acquiring module, a calculating module, and a scheduling module, wherein the names of these modules do not construe limitations of the modules themselves in a certain circumstance. For example, the acquiring module can also be described as "a module for acquiring, based on a task for scheduling automated guided vehicles, information of a set of temporary parking points and information of automated guided vehicles".

As another aspect, the present disclosure also provides a computer-readable medium, which may be included in the device described in the above embodiments or may exist alone without being assembled into the device. The above computer-readable medium carries one or more programs which, when executed by a device, causes the device to perform operations including: acquiring, based on a task for scheduling automated guided vehicles, information of a set of temporary parking points and information of automated guided vehicles; calculating, based on the information of the set of temporary parking points and the information of automated guided vehicles, the number of missing vehicles at each temporary parking point in the set of temporary parking points; and selecting, based on the number of missing vehicles, a target temporary parking point from the set of temporary parking points, and scheduling the automated guided vehicles to be scheduled to the target temporary parking point.

In the technical solution according to the embodiments of the present disclosure, firstly, the number of missing vehicles at each temporary parking point is calculated, then a target temporary parking point is selected based on the number of missing vehicles, and finally, the automated guided vehicles to be scheduled are scheduled to the target temporary parking point, such that a method for scheduling automated guided vehicles in a human-machine collaborative order picking mode can be provided; in the embodiments of the present disclosure, idle temporary parking points and unavailable temporary parking points are filtered out before the number of missing vehicles is calculated, such that the accuracy of scheduling AGV vehicles can be improved; in the embodiments of the present disclosure, after a temporary parking point is determined as an idle temporary parking point, the redundant AGV vehicles at the idle temporary parking point are placed in a set of idle vehicles, such that the AGV vehicles can be scheduled from the set of idle vehicles to the busy temporary parking point; in the embodiments of the present disclosure, during calculation of the number of missing vehicles at each temporary parking point, firstly, the required number of AGV vehicles at each temporary parking point is calculated according to the actual conditions, and then a difference value between the required number and the preoccupied number is determined as the number of missing vehicles, such that practicability and feasibility of the present technical solution can be improved; in the embodiments of the present disclosure, the required number of AGV vehicles at each temporary parking point is calculated in consideration of multiple perspectives such as the number of the temporary parking spaces, the time consumption information and the task boxes to be conveyed, such that a variety of scenario requirements can be provided, which increases the scheduling efficiency of the AGV vehicles and further improves the practicability of the present solution; in the embodiments of the present disclosure, a target temporary parking point is selected by comparing the numbers of missing vehicles, such that AGV vehicles to be scheduled can be allocated to the target temporary parking point.

The above embodiments do not construe definitions of the scope of protection of the present disclosure. Those skilled in the art should understand that various modifications, combinations, sub-combinations and substitutions may occur depending on the design requirements and other factors. Any modifications, equivalent substitutions and improvements, and the like within the spirit and principle of the present disclosure should be contained in the scope of protection of the present disclosure.

The invention claimed is:

1. A method for scheduling automated guided vehicles, characterized by comprising:
    acquiring, by one or more processors, based on a task for scheduling automated guided vehicles, information of a set of temporary parking points and information of automated guided vehicles;
    calculating, by the one or more processors, based on the information of the set of temporary parking points and the information of automated guided vehicles, the number of missing vehicles at each temporary parking point in the set of temporary parking points;
    selecting, by the one or more processors, based on the number of missing vehicles, a target temporary parking point from the set of temporary parking points, and scheduling the automated guided vehicles to be scheduled to the target temporary parking point, wherein
    before calculating, based on the information of the set of temporary parking points and the information of automated guided vehicles, the number of missing vehicles at the set of temporary parking points, the method further comprises:
        judging, for each temporary parking point in the set of temporary parking points, whether the temporary parking point is an idle temporary parking point or an unavailable temporary parking point, and if it is judged that the temporary parking point is an idle temporary parking point or an unavailable temporary parking point, filtering out the temporary parking point, wherein
        an idle temporary parking point refers to a temporary parking point at which there are automated guided vehicles that are waiting and there is no automated guided vehicle that is taking a conveying task and will leave within a predetermined time, and an unavailable temporary parking point refers to a temporary parking point at which the preoccupied number of automated guided vehicles reaches the preset maximum threshold.

2. The method according to claim 1, characterized in that: after judging whether the temporary parking point is an idle temporary parking point or an unavailable temporary parking point, the method further comprises:
    if the temporary parking point is an idle temporary parking point, reserving the automated guided vehicle ranked first in the queue for the temporary parking point, and adding other automated guided vehicles at the temporary parking point to a set of idle vehicles;
    judging whether there is a busy temporary parking point in the set of temporary parking points, and if yes, scheduling automated guided vehicles in the set of idle vehicles to the busy temporary parking point, wherein the busy temporary parking point refers to a temporary parking point at which the number of automated guided vehicles that perform conveying tasks per unit time exceeds a preset value.

3. The method according to claim 1, characterized in that: calculating, based on the information of the set of temporary parking points and the information of automated guided vehicles, the number of missing vehicles at each temporary parking point in the set of temporary parking points comprises:
    calculating, for each temporary parking point and based on the information of the set of temporary parking points and the information of the automated guided vehicles, the required number of automated guided vehicles at the temporary parking point, and then determining a difference value between the required number of automated guided vehicles at the temporary parking point and the preoccupied number of automated guided vehicles at the temporary parking point as the number of missing vehicles at the temporary parking point.

4. The method according to claim 3, characterized in that: the information of the set of temporary parking points includes the number of temporary parking spaces at each temporary parking point; and
    calculating the required number of automated guided vehicles at the temporary parking point includes:
        determining the number of temporary parking spaces at the temporary parking point as the required number of automated guided vehicles at the temporary parking point.

5. The method according to claim 3, characterized in that: calculating, based on the information of the set of temporary parking points and the information of the automated guided vehicles, the required number of automated guided vehicles at the temporary parking point includes:
    calculating the corresponding time consumption information at the temporary parking point based on a distance from a starting pickup point at the temporary parking point to a delivery line port, an operating speed of the automated guided vehicles and a conveyance duration at the temporary parking point;
    calculating, based on the corresponding time consumption information at the temporary parking point and a total number of the automated guided vehicles, the required number of automated guided vehicles at the temporary parking point.

6. The method according to claim 3, characterized in that: calculating, based on the information of the set of temporary parking points and the information of automated guided vehicles, the required number of automated guided vehicles at the temporary parking point includes:
  calculating, based on the number of task boxes to be conveyed at the temporary parking point and the number of task boxes conveyed by an automated guided vehicle at a time, the required number of automated guided vehicles at the temporary parking point.

7. The method according to claim 1, characterized in that: selecting, based on the number of missing vehicles, a target temporary parking point from the set of temporary parking points includes:
  comparing the numbers of missing vehicles at the respective temporary parking points in the set of temporary parking points, and selecting a temporary parking point with the maximum number of missing vehicles as the target temporary parking point.

8. An electronic device, characterized by comprising:
one or more processors;
a storage device for storing one or more programs,
when executed by the one or more processors, the one or more programs cause the one or more processors to perform a method for scheduling automated guided vehicles, the method comprises steps of:
  acquiring, by one or more processors, based on a task for scheduling automated guided vehicles, information of a set of temporary parking points and information of automated guided vehicles;
  calculating, by the one or more processors, based on the information of the set of temporary parking points and the information of automated guided vehicles, the number of missing vehicles at each temporary parking point in the set of temporary parking points;
  selecting, by the one or more processors, based on the number of missing vehicles, a target temporary parking point from the set of temporary parking points, and scheduling the automated guided vehicles to be scheduled to the target temporary parking point, wherein
  before calculating, based on the information of the set of temporary parking points and the information of automated guided vehicles, the number of missing vehicles at the set of temporary parking points, the method further comprises:
    judging, for each temporary parking point in the set of temporary parking points, whether the temporary parking point is an idle temporary parking point or an unavailable temporary parking point, and if it is judged that the temporary parking point is an idle temporary parking point or an unavailable temporary parking point, filtering out the temporary parking point, wherein
    an idle temporary parking point refers to a temporary parking point at which there are automated guided vehicles that are waiting and there is no automated guided vehicle that is taking a conveying task and will leave within a predetermined time, and an unavailable temporary parking point refers to a temporary parking point at which the preoccupied number of automated guided vehicles reaches the preset maximum threshold.

9. The method according to claim 8, characterized in that when executed by the one or more processors, the one or more programs cause the one or more processors to further perform steps of:
  if the temporary parking point is an idle temporary parking point, reserving the automated guided vehicle ranked first in the queue for the temporary parking point, and adding other automated guided vehicles at the temporary parking point to a set of idle vehicles;
  judging whether there is a busy temporary parking point in the set of temporary parking points, and if yes, scheduling automated guided vehicles in the set of idle vehicles to the busy temporary parking point, wherein the busy temporary parking point refers to a temporary parking point at which the number of automated guided vehicles that perform conveying tasks per unit time exceeds a preset value.

10. The method according to claim 8, characterized in that when executed by the one or more processors, the one or more programs cause the one or more processors to further perform steps of:
  calculating, based on the information of the set of temporary parking points and the information of automated guided vehicles, the number of missing vehicles at each temporary parking point in the set of temporary parking points comprises:
  calculating, for each temporary parking point and based on the information of the set of temporary parking points and the information of the automated guided vehicles, the required number of automated guided vehicles at the temporary parking point, and then determining a difference value between the required number of automated guided vehicles at the temporary parking point and the preoccupied number of automated guided vehicles at the temporary parking point as the number of missing vehicles at the temporary parking point.

11. The method according to claim 10, characterized in that when executed by the one or more processors, the one or more programs cause the one or more processors to further perform steps of:
  the information of the set of temporary parking points includes the number of temporary parking spaces at each temporary parking point; and
  calculating the required number of automated guided vehicles at the temporary parking point includes:
    determining the number of temporary parking spaces at the temporary parking point as the required number of automated guided vehicles at the temporary parking point.

12. The method according to claim 10, characterized in that when executed by the one or more processors, the one or more programs cause the one or more processors to further perform steps of:
  calculating, based on the information of the set of temporary parking points and the information of the automated guided vehicles, the required number of automated guided vehicles at the temporary parking point includes:
    calculating the corresponding time consumption information at the temporary parking point based on a distance from a starting pickup point at the temporary parking point to a delivery line port, an operating speed of the automated guided vehicles and a conveyance duration at the temporary parking point;
    calculating, based on the corresponding time consumption information at the temporary parking point and a total number of the automated guided vehicles, the required number of automated guided vehicles at the temporary parking point.

13. The method according to claim 10, characterized in that when executed by the one or more processors, the one or more programs cause the one or more processors to further perform steps of:

calculating, based on the information of the set of temporary parking points and the information of automated guided vehicles, the required number of automated guided vehicles at the temporary parking point includes:
   calculating, based on the number of task boxes to be conveyed at the temporary parking point and the number of task boxes conveyed by an automated guided vehicle at a time, the required number of automated guided vehicles at the temporary parking point.

14. The method according to claim 8, characterized in that when executed by the one or more processors, the one or more programs cause the one or more processors to further perform steps of:
   selecting, based on the number of missing vehicles, a target temporary parking point from the set of temporary parking points includes:
     comparing the numbers of missing vehicles at the respective temporary parking points in the set of temporary parking points, and selecting a temporary parking point with the maximum number of missing vehicles as the target temporary parking point.

15. A non-transitory computer-readable medium storing a computer program thereon, characterized in that: when executed by the processors, the program performs a method for scheduling automated guided vehicles, the method comprises:
   acquiring, by one or more processors, based on a task for scheduling automated guided vehicles, information of a set of temporary parking points and information of automated guided vehicles;
   calculating, by the one or more processors, based on the information of the set of temporary parking points and the information of automated guided vehicles, the number of missing vehicles at each temporary parking point in the set of temporary parking points;
   selecting, by the one or more processors, based on the number of missing vehicles, a target temporary parking point from the set of temporary parking points, and scheduling the automated guided vehicles to be scheduled to the target temporary parking point, wherein
before calculating, based on the information of the set of temporary parking points and the information of automated guided vehicles, the number of missing vehicles at the set of temporary parking points, the method further comprises:
   judging, for each temporary parking point in the set of temporary parking points, whether the temporary parking point is an idle temporary parking point or an unavailable temporary parking point, and if it is judged that the temporary parking point is an idle temporary parking point or an unavailable temporary parking point, filtering out the temporary parking point, wherein
   an idle temporary parking point refers to a temporary parking point at which there are automated guided vehicles that are waiting and there is no automated guided vehicle that is taking a conveying task and will leave within a predetermined time, and an unavailable temporary parking point refers to a temporary parking point at which the preoccupied number of automated guided vehicles reaches the preset maximum threshold.

\* \* \* \* \*